March 18, 1924.  A. HANSON  1,487,679
SAW JOINTER
Filed March 19, 1923
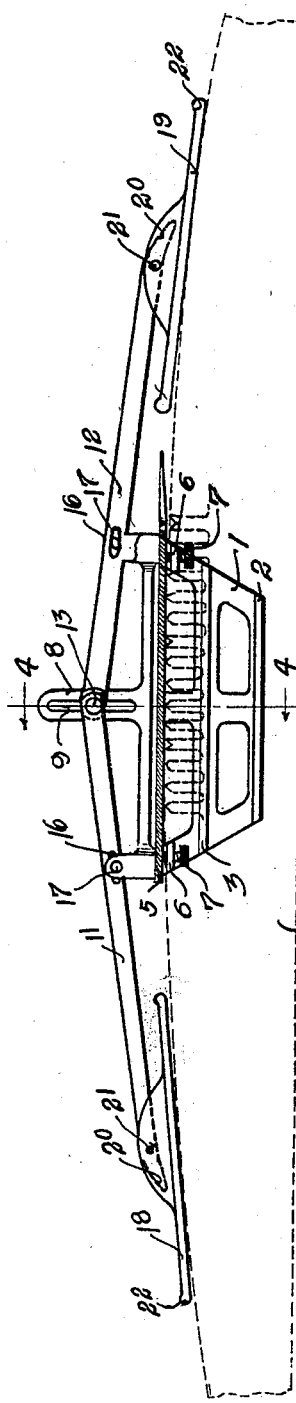
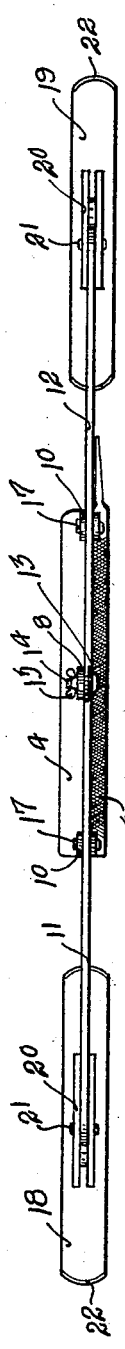
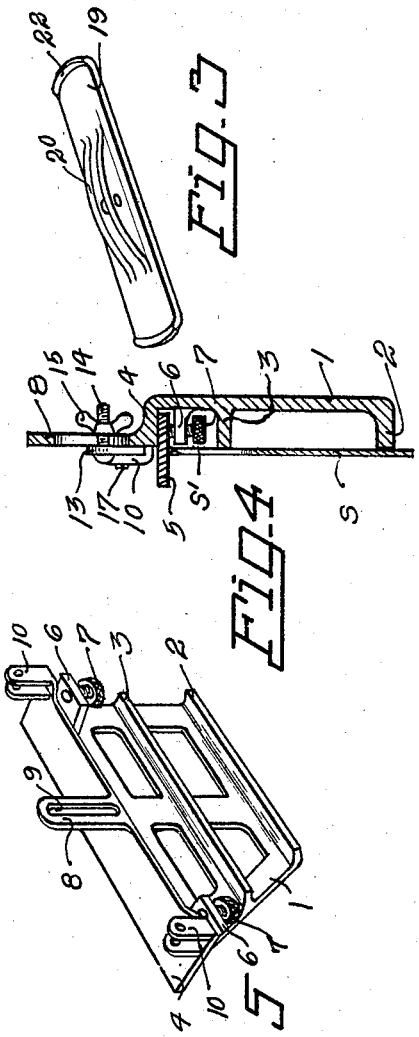
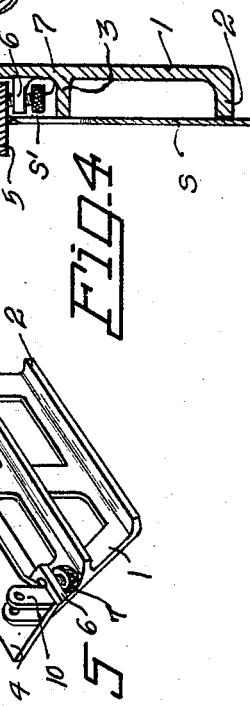
Inventor
Aron Hanson
By Herbert E. Smith
Attorney Patented Mar. 18, 1924.

1,487,679

UNITED STATES PATENT OFFICE.

ARON HANSON, OF LIBBY, MONTANA.

SAW JOINTER.

Application filed March 19, 1923. Serial No. 625,937.

*To all whom it may concern:*

Be it known that I, ARON HANSON, a citizen of Sweden, residing at Libby, in Lincoln County and State of Montana, have invented certain new and useful Improvements in Saw Jointers, of which the following is a specification.

My present invention relates to improvements in saw jointers designed especially for use in making and maintaining the teeth of saws of uniform length to insure facile operation of the saw in the performance of its regular functions.

The implement or tool is of the hand operated type, employing a file and file holder, adapted for reciprocation longitudinally of the saw for trimming the edges of the saw teeth. Means are provided for guiding the file and file holder with relation to the teeth of the saw, and the implement is fashioned in such manner as to lie close to and travel in contact with the saw blade for the purpose of insuring correct operating position of the file on the saw teeth.

The invention consists in certain novel combinations and arrangements of parts as will hereinafter be more fully described and claimed.

In the accompanying drawings I have illustrated one complete example of the physical embodiment of my invention wherein the parts are combined and arranged according to one mode I have devised for the practical application of the principles of my invention.

Figure 1 is a view in side elevation of the saw jointer, showing a saw in dotted lines, with the tool of the invention illustrated in operative position for reciprocation longitudinally of the saw blade.

Figure 2 is a top plan view of the jointer of Figure 1.

Figure 3 is a perspective view of one of the guide shoes for the jointer.

Figure 4 is an enlarged, transverse, sectional view at line 4—4 of Figure 1.

Figure 5 is a detail perspective view of the file holder detached.

The saw S illustrated in dotted lines is of the hand operated type used by woodmen, having its teeth S' arranged as a convex cutting edge for the saw, and the tool of the invention is especially adapted for ready adjustment to the curvature of the cutting edge of the saw in order that the file may perform its function of trimming the teeth to uniform lengths.

The file holder, designated as a whole by the numreal 1, is of proper size and shape to be grasped by the hand for manipulation of the jointer, and the holder is fashioned with a pair of parallel ribs 2 and 3, projecting laterally from the body of the holder and designed to lie in close contact with the adjoining face of the saw blade. As indicated in Figure 4 these ribs are maintained in contact with the surface at one side of the blade of the saw to guide the tool as it is reciprocated longitudinally of the saw.

An angular flange 4 is arranged at the top of the file holder, against which the flat file 5 is rigidly held at the underside of the flange, and spaced, perforated lugs 6 project laterally from the file holder, beneath this flange, to accommodate the set screw 7. In placing the file in position for use, it is fitted against the under side of the flange or top bar 4 of the holder, above the perforated lugs, and then the screws are turned in their lugs to securely clamp the file against the top bar of the holder, thus holding the file rigid with its carrier or holder. As seen in Figure 4 the file rests on the top of the saw teeth in a plane at right angles to the plane of the saw blade and the contact faces or edges of the ribs 2 and 3 are also in a plane at right angles to the working face of the file, thus insuring maintenance of the flat file in proper position to uniformly trim the saw teeth in a plane at right angles to the length of the teeth.

In addition to the above described laterally disposed means for guiding the tool as it is reciprocated on the cutting edge of the saw, means are provided for controlling the action of the file in trimming the saw teeth to a uniformity in depth along the predetermined curvature of the cutting edge of the saw.

Projecting upwardly from the center of the top of the file holder is an integral post 8 in which a slot 9 is provided, and at the ends of the file holder are provided complementary perforated ears 10, the post and ears being adapted to retain a pair of guide arms 11 and 12.

The arms have their adjoining ends 13 perforated for the reception of a clamp screw 14 and the nut 15 on the set screw is utilized to clamp these two ends to the post.

The set screw passes through the perforated ends of the arms and the slotted post, and the screw, when the nut is loosened, may be slid up and down in the slotted post, carrying with it the perforated ends of the arms, for adjusting the position of the arms.

Each arm is provided with a slot 16 intermediate its ends, and by means of pins 17 which pass through these slots and the perforated ears 10 of the file holder, the arms are pivoted in the perforated ears. The slots 16 permit the required longitudinal movement of the arms when their adjoining ends are being adjusted with relation to the slotted post, and the outer ends of the arms may thus be adjusted on the lines or arcs of circles of varying diameter.

At their outer ends the arms each carries a slide shoe, as 18 and 19, having perforated ears 20, and these shoes are pivoted on pins 21 to the arms. The shoes have approximately flat working faces on their under sides with upturned ends 22, and as the shoes extend longitudinally of the arms and project beyond the ends of the arms, they ride smoothly over the cutting edges of the saw teeth as the tool is reciprocated longitudinally of the saw. The upturned ends of the shoes prevent them from contacting directly with any of the saw teeth, and the length of the shoes is sufficient to insure a stable riding movement of the shoes on the saw edge. In adjusting the tool on the saw edge, it will be apparent that the centrally disposed file must rest on the cutting edges of the teeth, and the two shoes must be adjusted, through the instrumentality of their adjustable arms, to complementary positions and rest on the cutting edge of the saw. With these three points of support the jointer is stabilized, and as it is reciprocated the file trims the teeth on the proper line of curvature, the trimming action of the file being governed by the two shoes. With short reciprocating strokes, the jointer is passed from one end of the saw to its other end, trimming the teeth uniformly and maintaining the proper curvature of the cutting edge. By adjusting the inner ends of the arms 11 and 12, the jointer may be adjusted to different curvatures of saws.

From the above description taken in connection with my drawings it will be apparent that I have provided a portable, hand tool, which may be manipulated with facility and which is efficient in performing its required functions.

Having thus fully described my invention, what I claim as new and desire to secure by Letters Patent is:—

1. The combination with a saw jointer and its file, of longitudinally disposed arms having their inner ends adjustably secured to said jointer, and pivoted slide shoes at the free ends of said arms for guiding the file in a predetermined line along the cutting edge of saw teeth.

2. The combination with a saw jointer and its file, of a slotted post on the jointer, a pair of oppositely extending longitudinally disposed arms, said arms having their adjoining ends perforated and a set screw for securing said arms in adjusted relation to the post, spaced supports on the jointer for said arms, and pivoted guide shoes on the free ends of said arms.

In testimony whereof I affix my signature.

ARON HANSON.